United States Patent
Liav et al.

(10) Patent No.: US 7,574,541 B2
(45) Date of Patent: Aug. 11, 2009

(54) FIFO SUB-SYSTEM WITH IN-LINE CORRECTION

(75) Inventors: Ori Ron Liav, Fort Collins, CO (US); Jackson Lloyd Ellis, Fort Collins, CO (US); Kurt David Brocko, Fort Collins, CO (US)

(73) Assignee: LSI Logic Corporation, Milpitas, CA (US)

( * ) Notice: Subject to any disclaimer, the term of this patent is extended or adjusted under 35 U.S.C. 154(b) by 569 days.

(21) Appl. No.: 10/909,999

(22) Filed: Aug. 3, 2004

(65) Prior Publication Data

US 2006/0031610 A1 Feb. 9, 2006

(51) Int. Cl.
G06F 13/12 (2006.01)
G06F 13/38 (2006.01)

(52) U.S. Cl. .......................... 710/66; 710/29; 710/307; 714/52

(58) Field of Classification Search ............... 711/1–74; 710/29, 66, 307
See application file for complete search history.

(56) References Cited

U.S. PATENT DOCUMENTS

| | | | | |
|---|---|---|---|---|
| 5,220,569 A | * | 6/1993 | Hartness | 714/758 |
| 5,359,468 A | * | 10/1994 | Rhodes et al. | 360/48 |
| 5,590,309 A | * | 12/1996 | Chencinski et al. | 711/145 |
| 5,761,348 A | * | 6/1998 | Honma | 382/305 |
| 5,768,546 A | * | 6/1998 | Kwon | 710/307 |
| 6,636,949 B2 | * | 10/2003 | Barroso et al. | 711/141 |
| 6,961,877 B2 | * | 11/2005 | Si et al. | 714/49 |
| 7,050,461 B2 | * | 5/2006 | Abe et al. | 370/474 |
| 2001/0036322 A1 | * | 11/2001 | Bloomfield et al. | 382/276 |
| 2005/0033875 A1 | * | 2/2005 | Cheung et al. | 710/29 |

* cited by examiner

*Primary Examiner*—Henry W. H. Tsai
*Assistant Examiner*—Elias Mamo
(74) *Attorney, Agent, or Firm*—Yee & Associates, P.C.

(57) ABSTRACT

A flow-based FIFO sub-system for a disk formatter in a data processing system that performs data width conversion. The sub-system has a first FIFO unit having a first width interfacing to a first bursting channel, and a second FIFO unit having a second width interfacing to a second bursting channel, the second width not being a multiple of the first width and the first width not being a multiple of the second width. Data width conversion is performed between the first FIFO unit and the second FIFO unit to convert data moving from the first FIFO unit to the second FIFO unit from the first width to the second width, and to convert data moving from the second FIFO unit to the first FIFO unit from the second width to the first width. The sub-system also includes an Error Correcting Code interface between the first FIFO unit and the second FIFO unit for performing in-line correction.

8 Claims, 5 Drawing Sheets

FIFO SUB-SYSTEM WITH IN-LINE CORRECTION

BACKGROUND OF THE INVENTION

1. Technical Field

The present invention relates generally to the data processing field, and more particularly, to a FIFO sub-system for disk formatters and to a method for controlling the movement of data in a data processing system.

2. Description of the Related Art

Disk controllers are used to control the movement of data based on a request from an external system. A disk formatter is a submodule of a disk controller. Traditional disk formatters include a FIFO (First In-First Out) sub-system (sometimes referred to herein as a "FIFO") built from a single RAM (Random Access Memory) and having a first interface to larger memory device, such as a DDR (Double Data Rate) SDRAM (Synchronous Dynamic Random Access Memory), with an associated buffer controller to interface to the larger memory device, and a second interface to a Read/Write (R/W) channel device. Typically, the first interface's data path width is some multiple of the second interface's data path width. For example, the first interface can be 32-bits and the second interface can be 8-bits. Translation of the data path width in the FIFO sub-system is relatively straightforward and all counters are usually byte based. The interface to a DDR SDRAM controller, for example, transfers data on each clock that is as wide as the first interface. In addition, sector sizes are usually a multiple of the first and second interfaces.

Although the interfaces in this traditional disk controller FIFO are relatively easy to design, the FIFO does not provide satisfactory solutions to problems that may be encountered with respect to data width conversion, sector sizes that are not a multiple of the first interface, or a first interface which does not transfer its entire width on a given clock. In addition, this traditional FIFO does not provide an in-line ECC (Error Correcting Code) correction capability that is desirable in many applications.

Numerous FIFO sub-systems have been developed in an effort to overcome some of the inadequacies of traditional disk formatter FIFOs. For example, one known FIFO sub-system design includes two interfaces and provides error correction by having the ECC module work directly with the buffer controller arbiter to perform error correction during read operations. In this approach, buffer accesses must be performed in real time since the ECC module is part of a pipeline that needs to complete each set of buffer accesses within a sector time or less. Accordingly, this approach requires additional buffer bandwidth which will decrease the amount of buffer bandwidth available for other channels in the system.

Other known FIFO sub-systems include a third interface to provide in-line ECC correction. For example, one known FIFO sub-system having three interfaces utilizes three RAMs that alternate interfacing to the three interfaces during a data transfer operation. Each RAM is sized to hold one sector and implements a pipeline so that the three interfaces can work in parallel. For example, as the buffer controller receives data from a first sector from one RAM, a second RAM interfaces to the ECC to correct a second sector, and the R/W channel transmits data for a third sector into a third RAM. Each RAM rotates between the three interfaces so that each RAM can handle all of the transfer for a given sector. In one FIFO sub-system design, datapath width conversion is provided in the middle of the sub-system, while in another design, width conversion is performed at the first interface. These designs suffer from various disadvantages including restrictions in sector size, insufficient margins for latencies, increased complexity and increased size.

Another FIFO design having three interfaces utilizes a single three-port RAM with a different port of the RAM connected to each interface. Logic outside of the FIFO logic performs conversion between datapath widths. This design has the disadvantage of requiring a three-port RAM and requires solving problems encountered with respect to datapath width conversions in real time as the data is transferred with the R/W channel or the buffer controller.

In general, in known FIFO sub-systems that include an ECC capability, the ECC can negatively affect the overall bandwidth of the buffer. In current data processing systems, R/W data channel interfaces are increasing beyond 8-bits and many devices use a 32-bit DDR SDRAM. Due to on-demand requirements on the host interface side of the buffer controller, it is especially important that the ECC does not affect overall buffer bandwidth.

There is, accordingly, a need for a FIFO sub-system for a disk formatter in a data processing system that provides ECC correction and data path conversion without affecting the bandwidth of the buffer.

SUMMARY OF THE INVENTION

The present invention provides a flow-based FIFO sub-system for a disk formatter in a data processing system that performs data width conversion. The sub-system has a first FIFO unit having a first width interfacing to a first bursting channel, and a second FIFO unit having a second width interfacing to a second bursting channel, the second width not being a multiple of the first width and the first width not being a multiple of the second width. Data width conversion is performed between the first FIFO unit and the second FIFO unit to convert data moving from the first FIFO unit to the second FIFO unit from the first width to the second width, and to convert data moving from the second FIFO unit to the first FIFO unit from the second width to the first width. The FIFO sub-system also includes an Error Correcting Code interface between the first FIFO unit and the second FIFO unit for performing in-line correction.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

Figure 1:
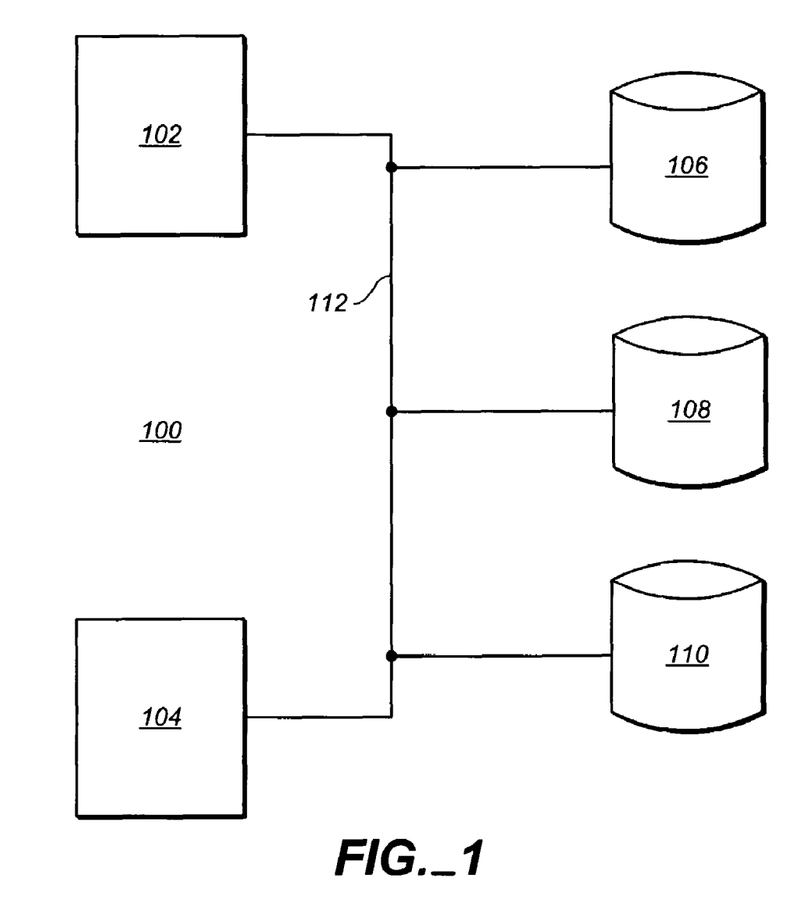
FIG. 1 is a pictorial representation of a data processing system in which the present invention may be implemented.

With reference now to the figures and in particular with reference to FIG. 1, a pictorial representation of a data processing system, in which the present invention may be implemented, is depicted. Data processing system 100 includes computer systems 102 and 104 connected to sub-systems 106, 108 and 110. These sub-systems are disk drive sub-systems in the depicted example. Computer systems 102 and 104 are connected to sub-systems 106, 108 and 110 by bus 112. Bus 112 may be implemented using a number of different architectures such as a SCSI (Small Computer System Interface) architecture or an FC (Fiber Channel) architecture.

Figure 2:
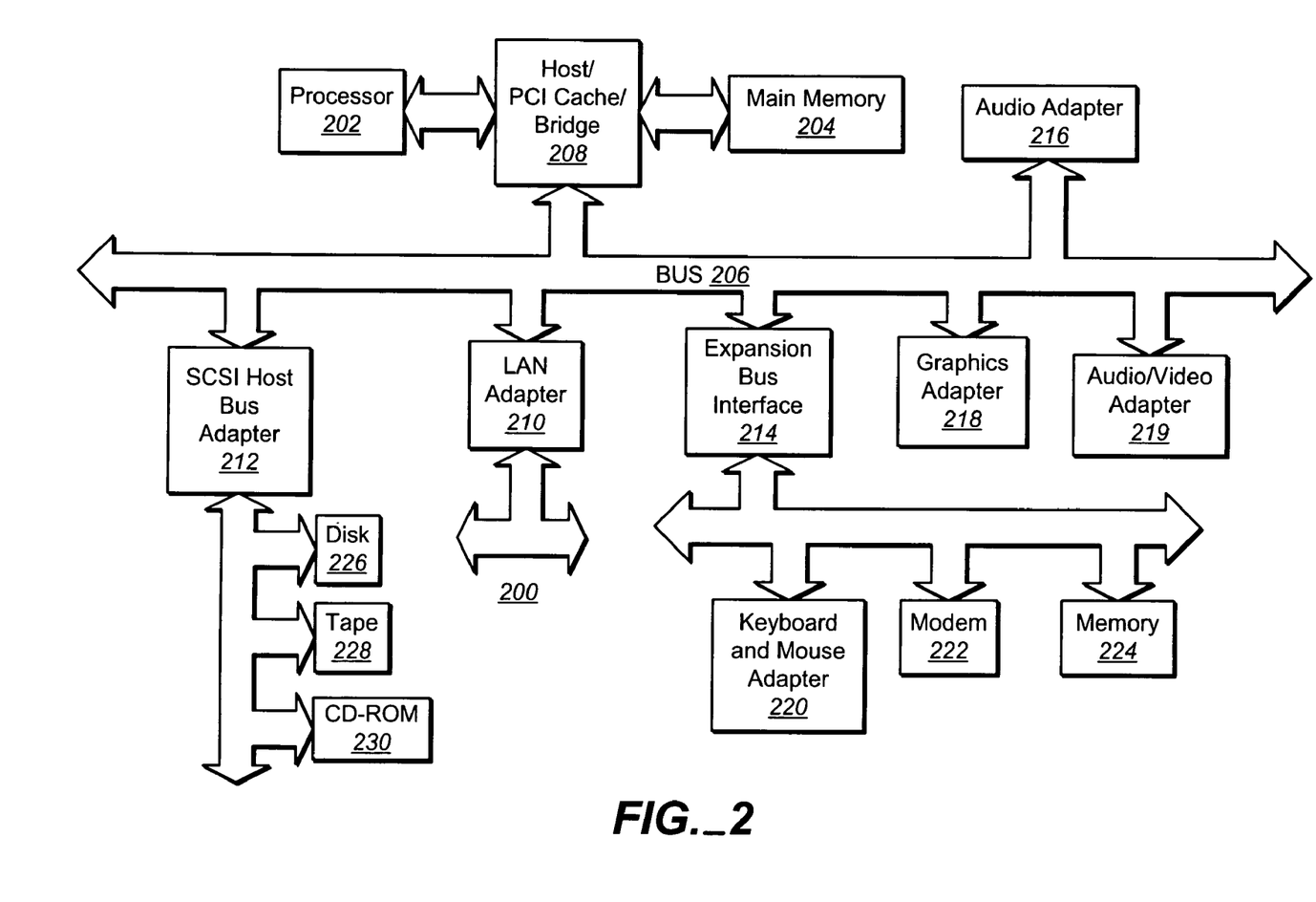
FIG. 2 is a block diagram of a data processing system in which the present invention may be implemented.

FIG. 2 is a block diagram of a data processing system in which the present invention may be implemented. Data processing system 200 is an example of a computer, such as computer 100 in FIG. 1, in which code or instructions implementing the processes of the present invention may be located. Data processing system 200 employs a Peripheral Component Interconnect (PCI) local bus architecture, although other bus architectures such as Accelerated Graphics Port (AGP) and Industry Standard Architecture (ISA) may be used. Processor 202 and main memory 204 are connected to PCI local bus 206 through PCI bridge 208. PCI bridge 208 may also include an integrated memory controller and cache memory for processor 202. Additional connections to PCI local bus 206 may be made through direct component interconnection or through add-in connectors. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

The depicted example in FIG. 2 and above-described examples are also not meant to imply architectural limitations. For example, data processing system 200 may also be a notebook computer or a hand-held computer.

The processes of the present invention are performed by processor 202 using computer implemented instructions, which may be located in a memory such as, for example, main memory 204, memory 224, or in one or more peripheral devices 226-230.

Figure 3:
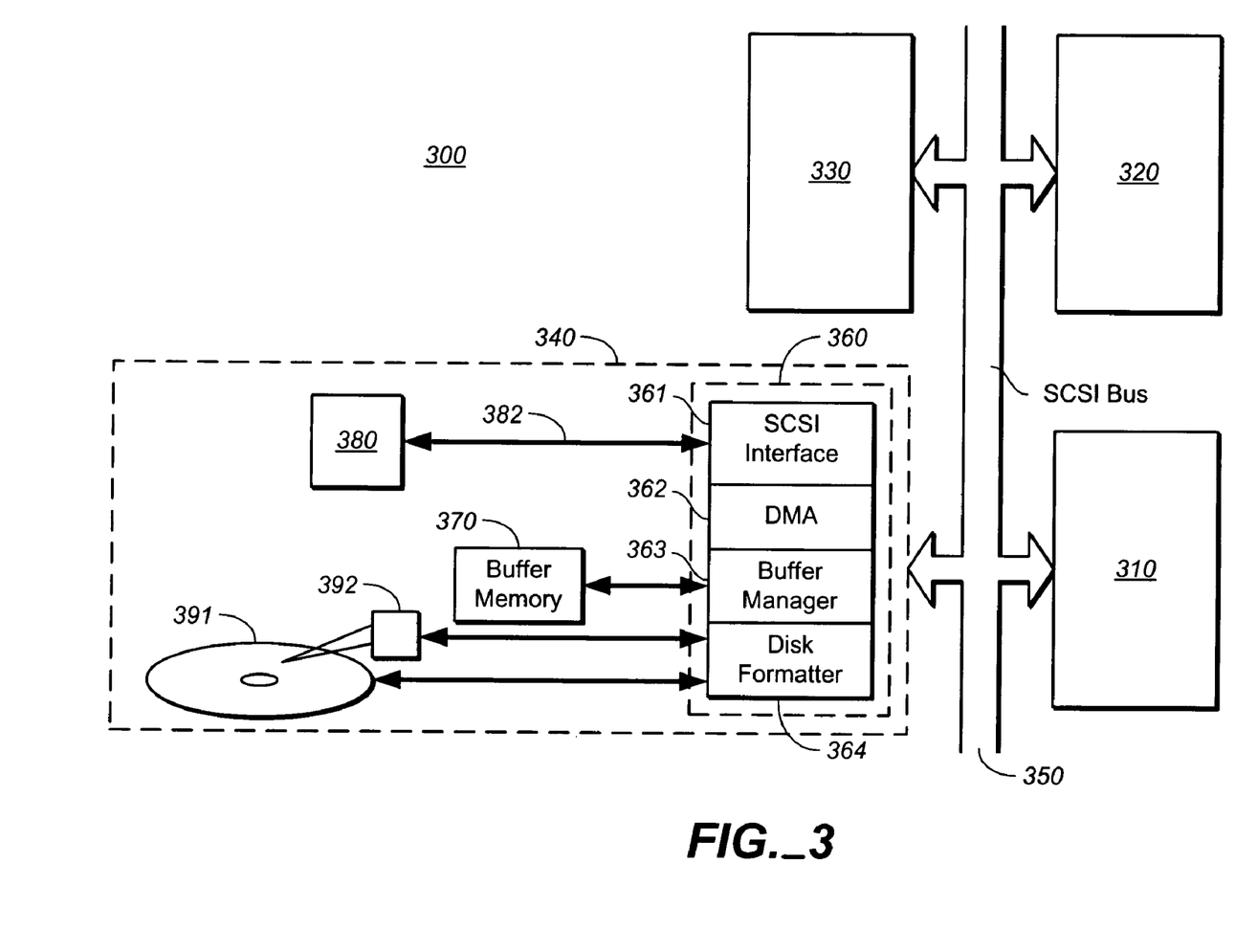
FIG. 3 is a block diagram that illustrates a bus configuration for a data processing system in which the present invention may be implemented.

FIG. 3 is a block diagram that illustrates a bus configuration for a data processing system in which the present invention may be implemented. The bus configuration, generally designated by reference number 300, is a SCSI bus in the depicted example, and includes external systems 310 and 320 and target devices 330 and 340 coupled to bus 350. Target device 340 is a hard disk drive system comprising disk controller 360, buffer memory 370, microprocessor 380, hard disk 391, and hard disk servo 392. Disk controller 360 includes functional blocks such as bus interface 361, DMA (Direct Memory Access) engine 362, buffer manager 363 and disk formatter 364. Disk controller 360 includes interfaces to buffer memory 370, microprocessor 380, a read/write interface to hard disk 391 and hard disk servo 392. Microprocessor interface 382 is connected to and controls the functional blocks depicted as bus interface 361, DMA engine 362, buffer manager 363 and disk formatter 364.

Figure 4:
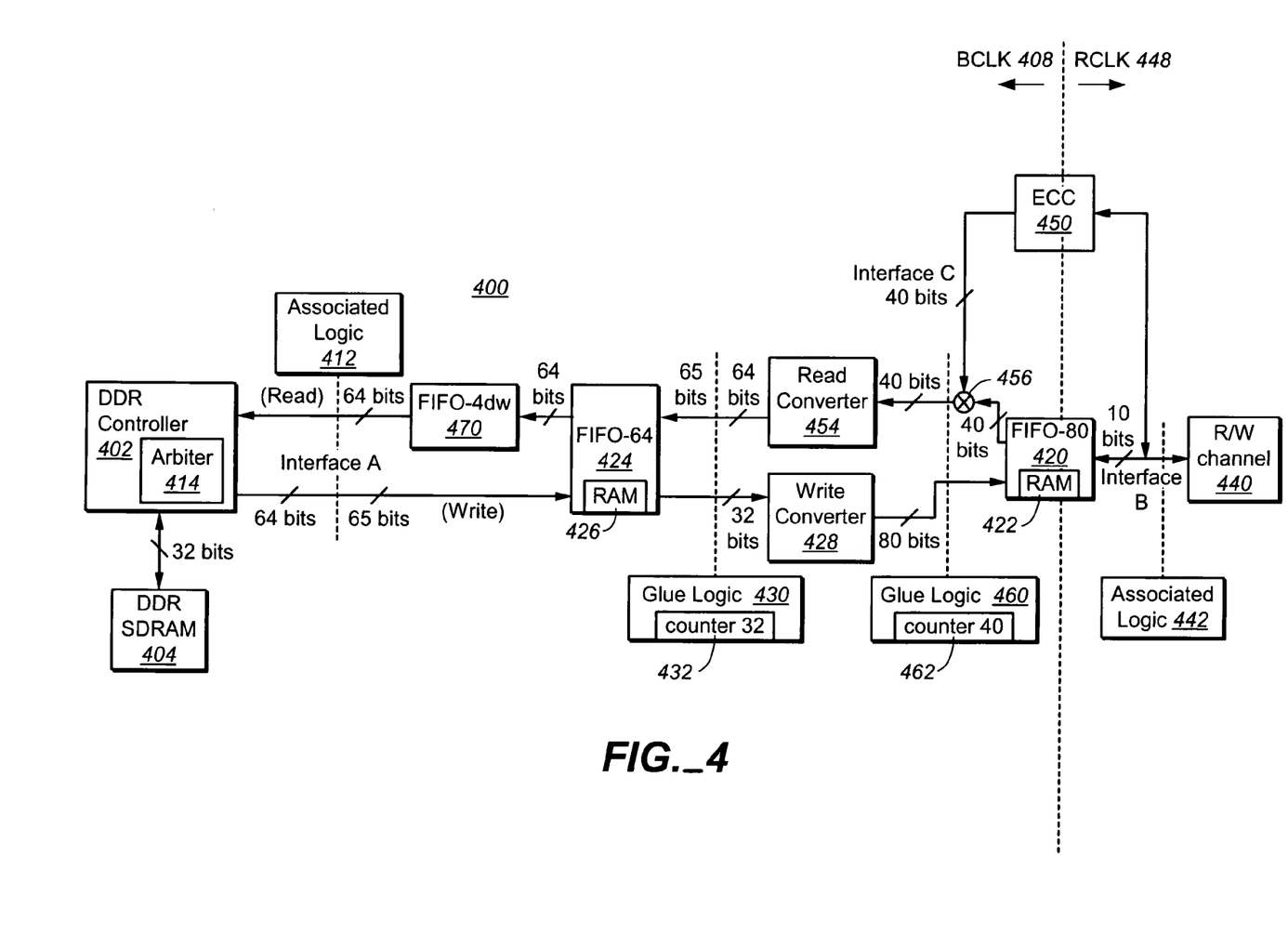
FIG. 4 is a block diagram that illustrates a FIFO sub-system for a disk formatter for a data processing system in accordance with a preferred embodiment of the present invention.

FIG. 4 is a block diagram that illustrates a FIFO sub-system for a disk formatter, such as disk formatter 364 illustrated in FIG. 3, in accordance with a preferred embodiment of the present invention. The FIFO sub-system is generally designated by reference number 400 and comprises a flow-based FIFO sub-system that performs data width conversion (flow-based means that data can be transferred through the sub-system with a low granularity, for example, 64-bit, rather than with a sector granularity). In the preferred embodiment illustrated in FIG. 4, FIFO sub-system 400 functions to convert a 64-bit datapath to a 10-bit datapath and vice versa; and, at the same time provide for ECC correction in a datapath that is at some multiple of 10-bits.

FIFO sub-system 400 includes three interfaces, designated as Interface A, Interface B and Interface C, that are designed to accomplish the following objectives:

1. Interface A-A 64-bit datapath interface that can burst to a DDR controller with a 32-bit granularity.
2. Interface B-A 10-bit interface that cannot be throttled.
3. Interface C-A 40-bit interface for in-line ECC correction.

As shown in FIG. 4, Interface A (write) is an interface to DDR controller 402. DDR SDRAM 404 is an external memory device that can burst 64-bits of data on each buffer clock (BCLK) 408. In order to gain access to the DDR for a write operation, DMA (Direct Memory Access) logic 412 associated with Interface A must first request access through DDR controller arbiter 414. Once access is granted, Interface A can begin bursting 64-bits each BCLK. Since Interface A is controlled at a sector granularity, and a sector can be, for example, 516 bytes, sometimes only the high or low 32-bits of the 64-bits is actually needed for moving across Interface A. In such a case, a flag bit (AW_DW_Enable: A Interface Write Double-Word Enable) on the interface indicates whether the data from the DDR is 64-bits or 32-bits. In FIG. 4, the flag bit is shown as the 65th bit on Interface A. If the data is 32-bits, the data is always moved to be on the low 32-bits of Interface A whether the data comes from the high or the low 32-bits of the DDR controller interface.

On each BCLK 408, either 32-bits or 64-bits of data and the AW_DW_Enable flag is passed from the DDR controller to FIFO-64 424 implemented as RAM 426. In DMA logic 412 associated with Interface A, there are counters that detect when FIFO-64 RAM 426 is nearing a full condition, and additional logic as is conventional for DMA channels which interface to a burstable external memory (for example, threshold compares to determine when to start bursts, CRC protection checks, logic to manage memory addressing and logic to count sectors and determine the end of a data transfer).

FIFO-64 424 is a simple FIFO implemented as RAM 426, with associated logic for address pointers, read prefetching and empty detection. FIFO-64 424 is fully synchronous in the preferred embodiment illustrated in FIG. 4, although the invention is not so limited. FIFO-64 RAM 426 is 65-bits wide (64 bits of data and a flag bit that indicates whether each entry holds 32-bits or 64-bits). The flag bit makes it simple for Interface A to burst 32-bit or 64-bit data into FIFO-64 RAM 426. Gaps next to the 64-bit data are not removed on the Interface A side. Instead, the gaps are removed on the interface to write converter module 428. As shown in FIG. 4, this interface is 32-bits. Each 65-bit RAM location provides write converter module 428 either two 32-bit data elements on two clocks, or one 32-bit data element on one clock, depending on whether the 32/64 flag bit is set in FIFO-64 RAM 426.

Write converter module 428 converts 32-bits to 80-bits. Write converter module 428 can be implemented in different ways. In a preferred implementation, write converter module 428 comprises a 64-bit register and associated muxes and logic, and functions by assembling 32-bits in the following pattern to output 80-bits (each of the following steps refers to tasks which may be performed in consecutive clocks):

1. Receive and store 32-bits in register (31:0)—32-bits now stored
2. Receive and store 32-bits in register (63:32)—64-bits now stored
3. Receive 32-bits, send 80-bits out (low 16-bits in appended to register (63:0)), and store high 16-bits in register (15:0)—16-bits now stored
4. Receive and store 32-bits in register (47:16)—48-bits now stored
5. Receive 32-bits and send 80-bits out (32-bits in appended to register (47:0))—0-bits now stored
6. Go back to step 1 and repeat.

Counter-32 432 is included in glue logic 430 associated with the interface between write converter 428 and FIFO-64 424. Counter-32 432 indicates the number of 32-bit words to move on the interface. Counter-32 432 could optionally be used for the entire transfer or may be omitted in alternative embodiments. In the present embodiment, Counter-32 432 is a sector counter. Counter-32 432 is used to indicate the number of 32-bit words to take out of FIFO-64 424 and to be put into write converter 428. This can be helpful when pad is needed at each sector boundary, as will be described below. Data is moved into write converter 428 whenever FIFO-64 424 is not empty, write converter 428 has room to take more data, and Counter-32 432 indicates to write more data. A similar sector counter, counter-40 462 associated with glue logic 460, exists on an interface between write converter 428 and FIFO-80 420, as will also be described below. On write transfers, Counter-32 432 and counter-40 462 are reloaded for a new sector only when they are both 0 and FIFO-64 424 is not empty. All of the logic runs on BCLK 408, however, the logic could also run on an asynchronous clock to BLCK 408.

FIFO-80 420 is a simple FIFO implemented as RAM 422 with associated logic for address pointers, read prefetching and empty detection. FIFO-80 420 is similar to FIFO-64 424 except that it includes additional synchronizers and logic needed to implement an asynchronous FIFO. RAM 422 is 80-bits wide. An 80-bit width provides common boundaries between the 64-bit data path and the 10-bit data path to help keep the converter modules simple. However, FIFO-80 420 could also be 40-bits. In either case, the width of FIFO-80 420 is not a multiple of the width of FIFO-64 424 and the width of FIFO-64 424 is not a multiple of the width of FIFO-80 420. Data is moved from write converter 428 to FIFO-80 420 whenever write converter 428 and FIFO-64 424 can provide a new 80-bits, FIFO-80 420 is not full, and counter-40 462 is greater than zero. Counter-40 462 counts the sector size in units of 40-bits. In the case of a write, counter-40 462 can be loaded with a larger or smaller sector size than Counter-32 432. If the sector size is larger, when Counter-32 432 reaches zero, pad data of zeros are appended to the data stream being written to FIFO-80 420 until the counter-40 count is reached. If the sector is smaller, the extra data represented by the larger Counter-32 count is discarded and is not written to FIFO-80 420. Every write to FIFO-80 420 is 80-bits (some of which may include pad data of zeros).

Interface B is an interface to a 10-bit formatter module represented by Associated Logic 442. During writes, the formatter moves data from FIFO-80 420 in disk FIFO subsystem 400 to external R/W channel device 440. The number of 10-bit symbols that are moved across this interface is controlled by a counter-10 (not shown). Counter-10 is loaded with the sector size to transfer out of FIFO-80 420 in units of 10-bit symbols. When the sector size is reached, any residue left in the current 80-bit line is discarded and the FIFO-80 RAM 422 address pointer is incremented to the next 80-bit line for starting the next sector. Interface B moves 10-bits on each RCLK clock 448 when associated logic 442 determines that the channel is ready to receive this data. In order to prefetch the next 80-bits, the FIFO-80 address pointer associated with Interface B increments after each 8 10-bit data elements are transferred to prefetch the next 80-bits from FIFO-80 RAM 422.

ECC 450 snoops and encodes the write data as it is transferred from FIFO-80 420 to external R/W channel device 440. ECC 450 then muxes ECC symbols onto Interface B during writes. This is convenient because the ECC symbol size matches the Interface B data path width. If the widths do not match, a data width conversion block can be added between ECC 450 and Interface B.

Interface C could optionally be used to insert the ECC symbols into FIFO-80 420. This approach allows an extra clock to be used, possibly for data width conversion, between the last symbol written to FIFO-80 420 that ECC 450 snoops for encoding the ECC bytes, and the ECC supplying the ECC symbols. However, ECC 450 would require a more costly encoder to encode the number of parallel symbols represented by the width of Interface C on each clock.

On Interface B during reads, the 10-bit interface to R/W channel device 440 provides the raw R/W channel data to FIFO-80 420. The FIFO-80 420 address pointer associated with Interface B increments to the next 80-bit RAM address after each 8 10-bit data element is written into FIFO-80 420. At the end of each sector, this address pointer is bumped up to the next 80-bit line so that each new sector starts on a new 80-bit line in the FIFO-80 RAM. ECC snoops the read data as it is transferred on Interface B and calculates the error correction locations and masks.

During a read operation, FIFO-80 420, implemented by RAM 422 and associated logic, works in a similar manner as during a write operation, except that data is now being written in 10-bits at a time from Interface B and read out 40-bits at a time on the interface to read converter 454 (40-bits was selected because it is the number of symbols, four 10-bit symbols, that ECC module 450 can correct in parallel in the preferred design). FIFO-80 420 is sized to hold about two sectors which allows time (plus margin) for ECC module 450 to calculate the error mask values without FIFO-80 RAM 422 overflowing.

Read converter module 454 is used to convert 40-bits to 64-bits. Counter-40 462 is used to know how much data to transfer from FIFO-80 420 to read converter 454 in a manner similar to the manner used on writes in the opposite direction. For each sector transfer, counter-40 462 is loaded so that it begins only after ECC module 450 indicates that it is ready to correct data. As the data is moved from FIFO-80 420 to read converter 454, XOR gates 456 are used to apply the ECC masks. Interface C is used to provide the ECC masks. ECC module 450 supplies a mask of 0x000 for any symbol that does not need to be corrected. Many different ECC architectures exist to permit ECC module 450 to perform corrections on the fly. One approach is to take the error location/mask pairs from ECC module 450, sort them and then compare the locations with the count of counter-40 462 to detect when they should be applied. The corrected data then goes to read converter 454.

Read converter 454 can be implemented in different ways. According to a preferred embodiment of the present invention, read converter 454 comprises a 96-bit register, an 8-bit temp register, and associated muxes and logic. Read converter 454 functions by assembling 40-bits in the following pattern to output 64-bits (each of the following steps refers to tasks which may be performed in consecutive clocks):
1. Receive 40-bits. Store input (31:0) in register (31:0) and store input (39:32) in temp (7:0)—now register has 32-bits of valid data
2. Receive 40-bits. Store {input (39:0)+temp (7:0)} in register (79:32)—now register has 80-bits of valid data
3. Send out register (63:0), shift register (79:64) into register (15:0), and receive 40-bits. Store input (31:0) in register (47:16) and store input (39:32) in temp (7:0)—now register has 48-bits of valid data
4. Receive 40-bits. Store {input (39:0)+temp (7:0)} in register (95:48)—now register has 96-bits of valid data
5. Send out register (63:0), shift register (95:64) into register (31:0) and receive 40-bits. Store input (31:0) in register (63:32) and store input (39:22) in temp (7:0)—now register has 64-bits of valid data
6. Send out register (63:0) and receive 40-bits. Store {input (39:0)+temp (7:0)} in register (47:0)—now register has 48-bits of valid data
7. Receive 40-bits. Store input (31:0) in register (79:48) and store input (39:32) in temp (7:0)—now register has 80-bits of valid data
8. Send out register (63:0), shift register (79:64) into register (15:0), and receive 40-bits. Store {input (39:0)+ temp (7:0)} in register (63:16)—now register has 64-bits of valid data
9. Send out register (63:0) and perform step 1 in the same clock. Then continue with step 2 in the next clock.

Counter 32 432 is used to count the 64-bit elements as they are moved from read converter 454 to FIFO-64 424. At the end of each sector, a 32-bit element can be taken out of read converter 454 and written to FIFO-64 424 with the associated 32/64 flag bit in FIFO-64 RAM 426 set to indicate that 32-bits are valid instead of 64-bits. As in the write direction, if counter-40 462 reaches the sector boundary before Counter-32 432, pad data of zeros will be appended until Counter-32 432 reaches the sector boundary. If Counter-32 432 reaches the sector boundary first, then the extra data represented by counter-40 462 will be discarded. This procedure is useful in removing padding inserted during a write operation to reach a 10-bit boundary, or adding pad to reach a 32-bit boundary when the data to be written to FIFO-64 424 from FIFO-80 420 is not 32-bit aligned (such as read long data that includes the data bytes and ECC symbols). Read converter 454 runs on BLCK 408, however, read converter 454 could also run on a different clock.

RAM 426 and associated logic of FIFO-64 424 operates in the same manner in a read operation as during a write operation, except that data is now being written in from read converter 454 64/32 bits at a time and read out 64/32-bits at a time to FIFO-4dw module 470.

FIFO-4dw 470 is a small FIFO that receives 64-bits or 32-bits from FIFO-64 424 and assembles 32-bit or 64-bit elements that can be burst to the DDR on Interface A. FIFO-4dw 470 is needed because FIFO-64 424 can have 32-bit elements with 32-bit pad next to the elements at some 64-bit RAM locations. In order to be able to continuously burst 64-bits across these pad locations, FIFO-4dw 470 is used to initially prefetch four 32-bit elements from FIFO-64 424. Any pad is discarded during this prefetch so that FIFO-64 424 has two 32-bit elements ready to go. Interface A can then begin the transfer, moving 64-bits at a time from FIFO-4dw 470 to DDR controller 402. Data is moved from FIFO-64 to FIFO-4dw when FIFO-64 has another 32-bit or 64-bit data element available and FIFO-4dw has enough space available for this data element.

During a data transfer to DDR controller 402, additional pad locations can cause FIFO-4dw 470 to fall behind. For example, initially, FIFO-4dw 470 has 128-bits prefetched. As DDR controller 402 bursts 64-bits out, FIFO-4dw 470 puts 64-bits from FIFO-64 424 back in. When a 32-bit element exists on the output to FIFO-64 424, FIFO-4dw 470 only puts 32-bits in as 64-bits are taken out. Thus, now FIFO-4dw 470 only has 96-bits. As additional 32-bit elements come from FIFO-64 424, FIFO-4dw 470 continues to fall behind until it can no longer supply 64-bits to Interface A. The logic associated with Interface A monitors the amount of data available in FIFO-4dw 470 on each clock. When the logic sees that the available data has fallen too low, it can end the burst to prevent an under-run. This is acceptable because pad is only added into FIFO-64 424 at sector boundaries and DDR bursts are usually less than two sectors. Accordingly, this under-run boundary should never occur. If an under-run does occur, and if it affects performance, the size of FIFO-4dw 470 can be increased. This would allow FIFO-4dw 470 to absorb more pad before under-running. The size of FIFO-4dw 470 can be increased until it allows for the burst size needed.

The FIFO sub-system of the present invention can be used in any environment where two bursting channels of different widths require a FIFO sub-system between them. The invention can also be used in an environment where an ECC is needed to perform in-line correction in the sub-system. In general, a FIFO sub-system, in accordance with a preferred embodiment of the present invention, provides a number of advantages over known FIFO sub-system designs. Among the provided advantages include:
1. The FIFO sub-system is constructed of easy to design sub-modules.
2. The flow-based FIFO allows for less latency through the FIFO, less expense to support larger sector sizes, and smaller granularity on thresholds against data ready to transfer in the FIFO (higher buffer bandwidth).
3. All FIFO units in the FIFO sub-system can be implemented with synchronous 2-port RAM cells, and all parts of the sub-system can be easily handled by design tools.
4. All RAMs in the sub-system can be easily sized to meet system parameters. FIFO-64 RAM 426 is sized to accommodate the latency to gain access to DDR controller 402. FIFO-80 RAM 420 is sized to accommodate the delay for ECC module 450 to be ready to supply correction masks.

5. Interfaces A, B and C are all relatively simple to design.
6. Data width conversion is performed in the middle of the FIFO sub-system where there is no bursting requirement. Thus, any widths that are convenient for the translation coming from/to the FIFOs in the sub-system can be used. When convenient, extra clocks, or a different clock period can be used to perform conversion so long as the conversion time does not become a bottleneck to the overall throughput of the FIFO sub-system.

Figure 5:
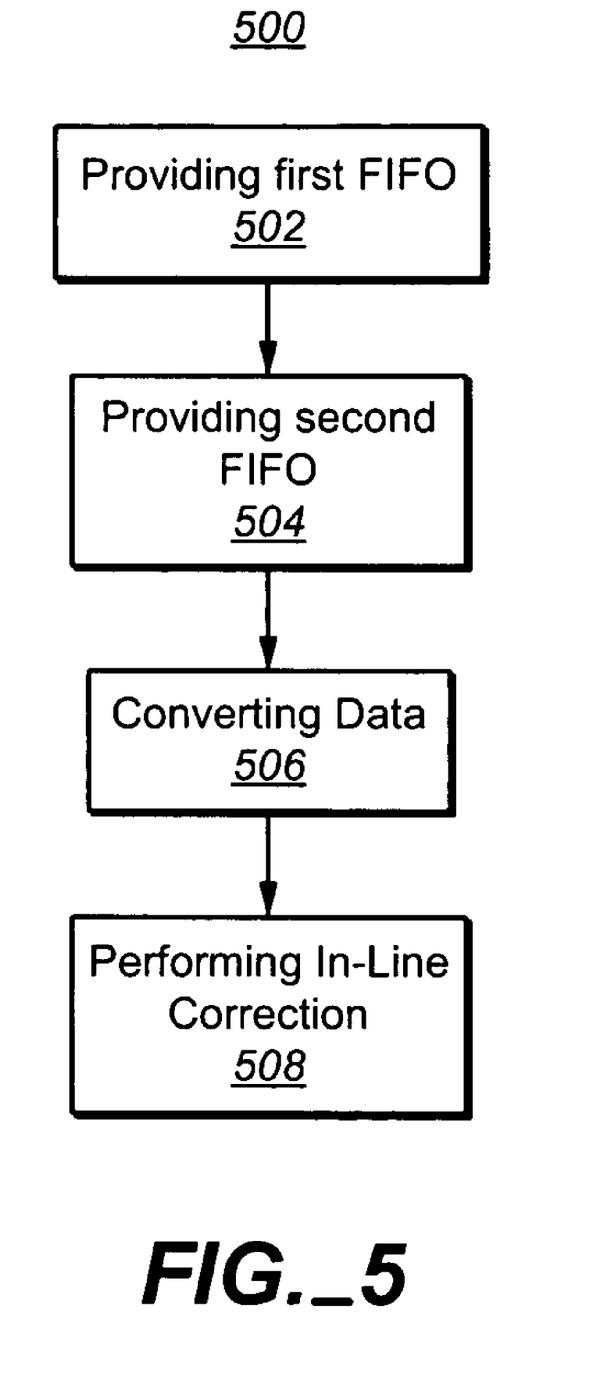
FIG. 5 is a flowchart that illustrates steps of a method for controlling the movement of data in a data processing system in accordance with a preferred embodiment of the present invention.

FIG. 5 is a flowchart that illustrates a method for controlling the movement of data in a data processing system in accordance with a preferred embodiment of the present invention. The method is generally designated by reference number 500 and includes providing a first FIFO unit having a first width interfacing to a first bursting channel (step 502), and providing a second FIFO unit having a second width interfacing to a second bursting channel (step 504). Data moving from the first FIFO unit to the second FIFO unit is converted from the first data width to the second data width, and data moving from the second FIFO unit to the first FIFO unit is converted from the second data width to the first data width (step 506). An ECC interface is provided between the first FIFO unit and the second FIFO unit for performing in-line correction (step 508).

The description of the preferred embodiment of the present invention has been presented for purposes of illustration and description, but is not intended to be exhaustive or limited to the invention in the form disclosed. Many modifications and variations will be apparent to those of ordinary skill in the art. For example, among the features that can be varied without departing from the scope of the invention include the widths of interfaces, the sizes of the FIFO units in the sub-system, and clock frequencies. In alternative embodiments also, the ECC can be synchronous or asynchronous to either Interface A or Interface B, FIFO-4dw 470 can be omitted, and additional logic can be added in the middle of the sub-system to perform the CRC data integrity check, data encoding/decoding, or the like. The embodiment described herein was chosen in order to best explain the principles of the invention and its practical application. This enables others of ordinary skill in the art to understand the invention for various embodiments with various modifications as are suited to the particular use contemplated.

What is claimed is:

1. A first-in-first-out (FIFO) sub-system for a disk formatter for controlling movement of data in a data processing system, the first-in-first out (FIFO) sub-system comprising:
a first FIFO unit, which has a first width, for receiving first data from and transferring second data to a first device using a first bursting channel having a first channel width, wherein the FIFO sub-system transfers the data according to a plurality of sector sizes;
the first device coupled to a memory device, the first device for receiving said first data from said memory device and transferring said second data to said memory device;
a second FIFO unit, which has a second width, for transferring said first data to and receiving said second data from a second device using a second bursting channel having a second channel width, wherein the second channel width is not a multiple of the first channel width and the first channel width is not a multiple of the second channel width, and wherein said second width is not a multiple of the first width and the first width is not a multiple of the second width;
a third FIFO unit having the first width and interfacing between the first bursting channel and the first FIFO for transferring the data during a read operation;
data width conversion means between the first FIFO unit and the second FIFO unit for converting said first data moving from the first FIFO unit to the second FIFO unit from the first width to the second width, and for converting said second data moving from the second FIFO unit to the first FIFO unit from the second width to the first width, wherein the data width conversion means comprises at least a first counter and a second counter, wherein the first counter and the second counter are sector counters, and wherein based on an indication from the sector counters, the data is adjusted to accommodate the plurality of sector sizes, by appending padding to the data as needed to convert said second data to the second FIFO unit during a write operation; and
a third interface to a third channel having a third channel width for performing error correction, wherein the error correction during a read operation is performed as the data is moved from the second FIFO unit to a read converter, and wherein the error correction during a write operation is performed as the data is moved from the second FIFO unit to an external read/write device, wherein the error correction occurs as a part of the FIFO sub-system and within the disk formatter.

2. The FIFO sub-system of claim 1, wherein the first bursting channel comprises a channel to a double data rate synchronous dynamic random access memory (DDR SDRAM) controller, the memory device is a double data rate synchronous dynamic random access memory (DDR SDRAM), the second device is the external read/write device, and the second bursting channel comprises a channel to a read/write channel device.

3. The FIFO sub-system of claim 1, wherein the first channel width is 64-bits, the second channel width is 10-bits, and the third channel width is a multiple of the second width.

4. The FIFO sub-system of claim 3, wherein the third channel width is 40-bits.

5. A method in a first-in-first-out (FIFO) sub-system for a disk formatter for controlling movement of data in a data processing system, the first-in-first out (FIFO) sub-system comprising:
providing a first FIFO unit, which has a first width, for receiving first data from and transferring second data to a first device using a first bursting channel having a first channel width, wherein the FIFO sub-system transfers the data according to a plurality of sector sizes;
the first device coupled to a memory device, the first device receiving said first data from said memory device and transferring said second data to said memory device;
providing a second FIFO unit, which has a second width, for transferring said first data to and receiving said second data from a second device using a second bursting channel having a second channel width, wherein the second channel width is not a multiple of the first channel width and the first channel width is not a multiple of the second channel width, and wherein said second width is not a multiple of the first width and the first width is not a multiple of the second width;
converting said first data moving from the first FIFO unit to the second FIFO unit from the first data width to the second data width, and converting said second data moving from the second FIFO unit to the first FIFO unit from the second data width to the first data width, wherein a first counter and a second counter are used in the conversion, wherein the first counter and the second counter are sector counters, and wherein, based on an indication by the sector counters, the data is adjusted to accommodate the plurality of sector sizes, wherein the data is adjusted by appending padding to the data as needed to convert said second data to the second FIFO unit during a write operation; and providing a third interface to a third channel having a third channel width for performing error correction, wherein the error correction during a read operation is performed as the data is moved from the second FIFO unit to a read converter, and wherein the error correction during a write operation is performed as the data is moved from the second FIFO unit to an external read/write device, wherein the error correction occurs as a part of the FIFO sub-system and within the disk formatter.

6. The method of claim 5, wherein the first device is a double data rate synchronous dynamic random access memory (DDR SDRAM) controller, wherein the memory device is a double data rate synchronous dynamic random access memory (DDR SDRAM), and wherein the second device is the external read/write device.

7. The FIFO sub-system of claim 1, wherein the first FIFO unit, the second FIFO unit, and the third FIFO unit are implemented using synchronous two-port RAM cells.

8. The FIFO sub-system of claim 1, wherein data width conversion is performed in a middle section of the FIFO sub-system where no bursting requirement exists.

* * * * *